(12) United States Patent
Wiggins et al.

(10) Patent No.: US 11,947,056 B1
(45) Date of Patent: Apr. 2, 2024

(54) PIXELATED, LARGE ACTIVE AREA SCINTILLATING SCREENS

(71) Applicant: Triad National Security, LLC, Los Alamos, NM (US)

(72) Inventors: Brenden W. Wiggins, Los Alamos, NM (US); Markus Peter Hehlen, Los Alamos, NM (US); James F. Hunter, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 17/854,961

(22) Filed: Jun. 30, 2022

Related U.S. Application Data

(60) Provisional application No. 63/217,235, filed on Jun. 30, 2021.

(51) Int. Cl.
    *G01T 1/20* (2006.01)
    *G01T 1/202* (2006.01)

(52) U.S. Cl.
    CPC .......... *G01T 1/2002* (2013.01); *G01T 1/2023* (2013.01)

(58) Field of Classification Search
    CPC .................. G01T 1/2002; G01T 1/2023
    See application file for complete search history.

(56) References Cited

U.S. PATENT DOCUMENTS

| | | | | |
|---|---|---|---|---|
| 5,981,959 | A * | 11/1999 | Apte | G01T 1/2006 250/483.1 |
| 6,177,236 | B1 * | 1/2001 | Apte | G21K 4/00 430/323 |
| 6,272,207 | B1 * | 8/2001 | Tang | G21K 1/025 378/154 |
| 9,219,093 | B1 * | 12/2015 | Vora | H01L 27/14636 |
| 2003/0128813 | A1 * | 7/2003 | Appleby | B29C 69/001 378/147 |
| 2004/0156478 | A1 * | 8/2004 | Appleby | B29C 33/302 264/318 |
| 2015/0338529 | A1 * | 11/2015 | Svenonius | G01T 1/2002 264/135 |
| 2016/0293285 | A1 * | 10/2016 | Fujiwara | G01T 1/2002 |

* cited by examiner

*Primary Examiner* — Hugh Maupin
(74) *Attorney, Agent, or Firm* — Lewis Roca Rothgerber Christie LLP

(57) ABSTRACT

A pixelated X-ray conversion screen includes a metal aperture sheet having a pixel hole filled with a scintillator material, wherein an area of the pixel hole is equal to or less than about 0.25 mm².

20 Claims, 13 Drawing Sheets

US 11,947,056 B1

PIXELATED, LARGE ACTIVE AREA SCINTILLATING SCREENS

CROSS-REFERENCE TO RELATED APPLICATION

This application claims priority to and the benefit of U.S. provisional application No. 63/217,235, filed on Jun. 30, 2021, the entire content of which is hereby incorporated by reference.

STATEMENT REGARDING GOVERNMENT RIGHTS

The United States government has rights in this invention pursuant to Contract No. 89233218CNA000001 between the United States Department of Energy/National Nuclear Security Administration and Triad National Security, LLC for the operation of Los Alamos National Laboratory.

INTRODUCTION

X-ray imaging plays an import role in various industries, such as non-destructive assessment and testing, quality control, security screening, and medical imaging. X-ray imaging of the related art uses an X-ray conversion medium to convert X-rays into visible light. An image can then be generated from the visible light using a camera system. The fundamental constraints of X-ray imaging fall into three categories: (1) detection efficiency, (2) spatial resolution, and (3) frame acquisition rates. It is desired to improve detection efficiency while at least maintaining the spatial resolution and frame acquisition rate of camera systems.

X-ray conversion mediums of the related art use a monolithic phosphor screen that can introduce image quality constraints depending on the energy of the incident X-rays and the thickness of the X-ray conversion medium. For example, significant optical and X-ray scattering may occur in these X-ray conversion mediums that deteriorate the image quality of the generated X-ray images.

The information disclosed in this Introduction section is only for providing an understanding of background information of embodiments of the present disclosure, and, therefore, it may contain information that does not constitute prior art.

SUMMARY

In an aspect, the technology relates to pixelated X-ray conversion screen, including: a metal aperture sheet having a pixel hole filled with a scintillator material including a mixture including scintillator crystals and an organic binder, an area of the pixel hole in a plan view being equal to or less than about 0.25 $mm^2$.

In some embodiments, the metal aperture sheet includes an active area having a plurality of pixel holes, an area of the active area in the plan view being equal to or greater than about 10,000 $mm^2$, and a minimum distance between adjacent pixel holes of the plurality of pixel holes is equal to or less than about 0.5 mm. In some embodiments, the pixelated X-ray conversion screen further includes a plurality of metal aperture sheets including the metal aperture sheet, each of the plurality of metal aperture sheets having a pixel hole having an area in the plan view equal to or less than about 0.25 $mm^2$, wherein the plurality of metal aperture sheets are arranged in a stack and bonded together, and wherein the respective pixel holes of the plurality of metal aperture sheets are aligned in the plan view. In some embodiments, the plurality of metal aperture sheets include a first metal, and the pixelated X-ray conversion screen further includes an intermediate metal sheet between adjacent metal aperture sheets of the plurality of metal aperture sheets and including a second metal different from the first metal. In some embodiments, a refractive index of the scintillator crystals is within a range of about 1.3 to about 1.9, and the scintillator crystals are substantially the same in refractive index as the organic binder. In some embodiments, a sidewall of the metal aperture sheet forming the pixel hole is coated with a reflective coating, the reflective coating including a different metal than the metal aperture sheet.

In another aspect, the technology relates to a pixelated X-ray conversion screen, including: a plurality of metal aperture sheets, each of the plurality of metal aperture sheets having a pixel hole having an area in a plan view equal to or less than about 0.25 $mm^2$ and filled with a scintillator material, wherein the plurality of metal aperture sheets are arranged in a stack and bonded together.

In some embodiments, the pixelated X-ray conversion screen further includes one or more intermediate metal sheets alternately arranged with the plurality of metal aperture sheets, the one or more intermediate metal sheets including a different metal than the metal aperture sheets. In some embodiments, an area of a metal aperture sheet of the plurality of metal aperture sheets in the plan view is equal to or greater than about 10,000 $mm^2$, and a thickness of the stack is equal to or less than about 10 mm. In some embodiments, the scintillator material includes a mixture including scintillator crystals and an organic binder, a refractive index of the scintillator crystals being within a range of about 1.3 to about 1.9, and the scintillator crystals being substantially the same in refractive index as the organic binder. In some embodiments, the scintillator material includes a glass composition having a refractive index within a range of about 1.4 to about 2.2. In some embodiments, the scintillator material includes a glass-ceramic including crystals within a portion of the glass composition in an amorphous phase. In some embodiments, the glass composition is substantially entirely in an amorphous phase.

In another aspect, the technology relates to a pixelated X-ray conversion screen, including: a metal aperture sheet having a pixel hole filled with a scintillator material including a glass composition, an area of the pixel hole in a plan view being equal to or less than about 0.25 $mm^2$.

In some embodiments, the metal aperture sheet includes an active area having a plurality of pixel holes, an area of the active area in the plan view being equal to or greater than about 10,000 $mm^2$, and a minimum distance between adjacent pixel holes of the plurality of pixel holes is equal to or less than about 0.5 mm. In some embodiments, the pixelated X-ray conversion screen further includes a plurality of metal aperture sheets including the metal aperture sheet, each of the plurality of metal aperture sheets having a pixel hole having an area in the plan view equal to or less than about 0.25 $mm^2$, wherein the plurality of metal aperture sheets are arranged in a stack and bonded together, and wherein the respective pixel holes of the plurality of metal aperture sheets are aligned in the plan view. In some embodiments, the glass composition includes a glass-ceramic including crystals within a portion of the glass composition in an amorphous phase. In some embodiments, the glass composition includes at least one network-forming compound including a boron oxide, a silicon oxide, and/or a germanium oxide. In some embodiments, the glass composition is a borate-based glass composition. In some embodiments, the glass composition further includes at least one network modifier compound including an aluminum oxide, a bismuth oxide, a lead oxide, a uranium oxide, and/or a thallium oxide.

This summary is provided to introduce a selection of concepts in a simplified form that are further described below in the Detailed Description. This summary is not intended to identify key, critical, or essential features of the claimed subject matter, nor is it intended to be used to limit the scope of the claimed subject matter.

BRIEF DESCRIPTION OF THE DRAWINGS

These and other features of embodiments of the present disclosure will be better understood by reference to the following detailed description when considered in conjunction with the accompanying drawings, in which.

DETAILED DESCRIPTION

Figure 1:
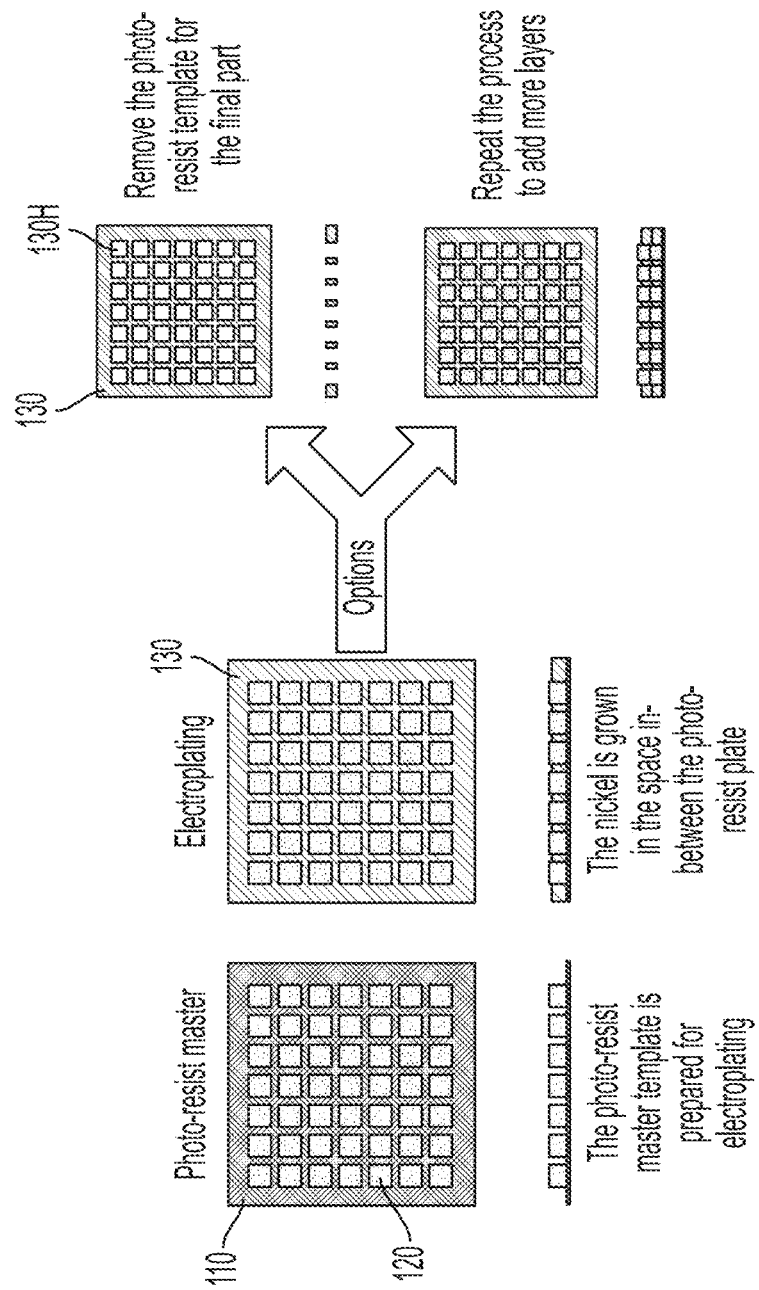
FIG. 1 shows a plan view of a metal aperture sheet and a method of fabricating the metal aperture sheet according to some embodiments.

Embodiments of a method for fabricating an X-ray conversion screen and of a corresponding apparatus will be described herein with reference to the accompanying drawings.

As used herein, the use of the term "may," when describing embodiments of the present disclosure, refers to "one or more embodiments of the present disclosure."

As used herein, the term "and/or" includes any and all combinations of one or more of the associated listed items.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present disclosure.

As used herein, the singular forms "a", "an" and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on" or "adjacent to" another element or layer, it can be directly on or adjacent to the other element or layer, or one or more intervening element(s) or layer(s) may be present. In contrast, when an element or layer is referred to as being "directly on" or "immediately adjacent to" another element or layer, there are no intervening elements or layers present.

As used herein, and unless otherwise indicated, the term "substantially" and similar terms are used as terms of approximation and not as terms of degree, and are intended to account for the inherent deviations in measured or calculated values that would be recognized by those of ordinary skill in the art. Also, the term "about" and similar terms, when used herein in connection with a numerical value or a numerical range, are inclusive of the stated value and mean within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the term "major component" refers to a component that is present in a composition in an amount greater than an amount of any other single component in the composition. In contrast, the term "primary component" refers to a component that makes up at least 50% (wt % or at %) or more of the composition.

According to some embodiments of the present disclosure, an X-ray conversion screen may include one or more metal aperture sheets that are arranged in a stack and bonded together. Each metal aperture sheet may include a plurality of pixel holes, and the pixel holes of a plurality of metal aperture sheets that are stacked and bonded together may be aligned in a stacking direction (e.g., a thickness direction) to form pixel holes in the X-ray conversion screen extending from one surface (e.g., a top surface) of the X-ray conversion screen to another surface (e.g., a bottom surface) of the X-ray conversion screen. For example, the metal aperture sheets may be arranged such that their corresponding pixel holes overlap in a plan view. The pixel holes of the metal aperture sheets may be filled (e.g., partially or entirely filled) with a scintillator material suitable to convert X-ray light into light of another wavelength range that can be utilized to form an image (e.g., a digital image or a non-digital image), for example, visible light, ultraviolet light, or infrared light. The scintillator material filling a pixel hole of the X-ray conversion screen may constitute a pixel of the X-ray conversion screen.

The methods for forming an X-ray conversion screen disclosed herein allow an X-ray conversion screen with a large, pixelated active area having a plurality of thick, small-area pixels to be fabricated. Accordingly, the quality of an X-ray image can be improved.

Fabrication of the Metal Aperture Sheets

Referring to FIG. 1, a metal aperture sheet 130 may be fabricated in some embodiments by electroforming. Electroforming is a process where a conductive surface (e.g., indium tin oxide, a metal, etc.) acting as a cathode is coated with a metal by placing the conductive surface in an electrolyte solution including cations of the metal, and a current is generated through the electrolyte solution to cause the reduction of the cations onto the conductive surface, thereby forming a layer of the metal on the surface of the conductive surface. A metal of the conductive surface and a metal coated on the conductive surface may be different or the same.

In some embodiments, the metal aperture sheet 130 is fabricated by electroforming a metal onto a master template (e.g., a lithographic mask). The master template may include an electrically conductive substrate 110 and a plurality of protrusions 120 (e.g., bumps, columns, pillars, etc.) on a surface of the electrically conductive substrate 110. The protrusions 120 may correspond to pixel holes 130H that are to be formed in the metal aperture sheet 130 and may be arranged in any suitable arrangement on the electrically conductive substrate 110, for example, in a matrix or grid arrangement. The protrusions 120 may include (e.g., be) a material that substantially prevents electroforming from occurring at (e.g., on surfaces of) the protrusions 120. Therefore, the metal may be formed on the electrically conductive substrate 110 and around (e.g., in spaces between) the protrusions 120 during the electroforming process. For example, the metal formed on the electrically conductive substrate 110 may have a mesh pattern in a plan view. In some embodiments, the protrusions 120 are not electrically conductive and/or are substantially non-reactive (e.g., chemically inert) during the electroforming process. The protrusions 120 may be a photoresist or any suitable light-sensitive material. The protrusions 120 may be formed by a photoresist material being laminated or spun onto the electrically conductive substrate 110. In some embodiments, photolithography techniques are then used to pattern the photoresist material in the shape of the protrusion pattern by exposing the photoresist material to light through a photomask.

During the electroforming process, the electrically conductive substrate 110 may function as a cathode, the master template may be placed in an electrolyte solution including cations of the metal that is to form the metal aperture sheet 130, and the cations may be reduced to metallic form on the electrically conductive substrate 110 when a current is generated in the electrolyte solution. When the metal has been formed to a suitable or desired thickness, the electroforming process may be stopped, and the metal aperture sheet 130 formed on the master template may be separated from the master template by any suitable means.

In some embodiments, a plurality of individual metal aperture sheets are fabricated individually and then stacked and bonded together to form an X-ray conversion screen having a desired thickness. However, the present disclosure is not limited thereto. For example, in some embodiments, a single, thick monolithic metal aperture sheet is fabricated by performing a sequence of electroforming processes before removing the metal aperture sheet from the master template.

The pixel holes 130H in the metal aperture sheet 130 may correspond to where electroforming did not occur. For example, the pixel holes 130H may correspond to the protrusions 120. The protrusions 120 (and thus, the pixel holes 130H) may be arranged with each other in any suitable arrangement, for example, in a matrix array or a grid arrangement. The protrusions 120 may have a thickness at least as great as the thickness of the metal aperture sheet that is to be formed on the master template, and the protrusions 120 may have any suitable shape in the plan view (planar shape), such as a square or a circle shape. In some embodiments, the protrusions all have the same planar shape, but the present disclosure is not limited thereto. For example, a first protrusion of the protrusions 120 may have a first planar shape, and a second protrusion of the protrusions 120 may have a second planar shape different from the first planar shape.

The metal aperture sheet 130 may be fabricated from any suitable metal. Any metal that may be electroplated on the electrically conductive substrate 110 may be utilized. In some embodiments, the metal is a transition metal or a metal having a high density. For example, the metal may be nickel, copper, gold, or tungsten, but the present disclosure is not limited thereto.

In some embodiments, a plurality of metal aperture sheets 130 is fabricated and bonded together in a stack. Each of the plurality of metal aperture sheets 130 may include the same metal, but the present disclosure is not limited thereto. For example, a first metal aperture sheet of the plurality of metal aperture sheets 130 may include a first metal, and a second metal aperture sheet of the plurality of metal aperture sheets 130 may include a second metal different from the first metal.

Figure 2:
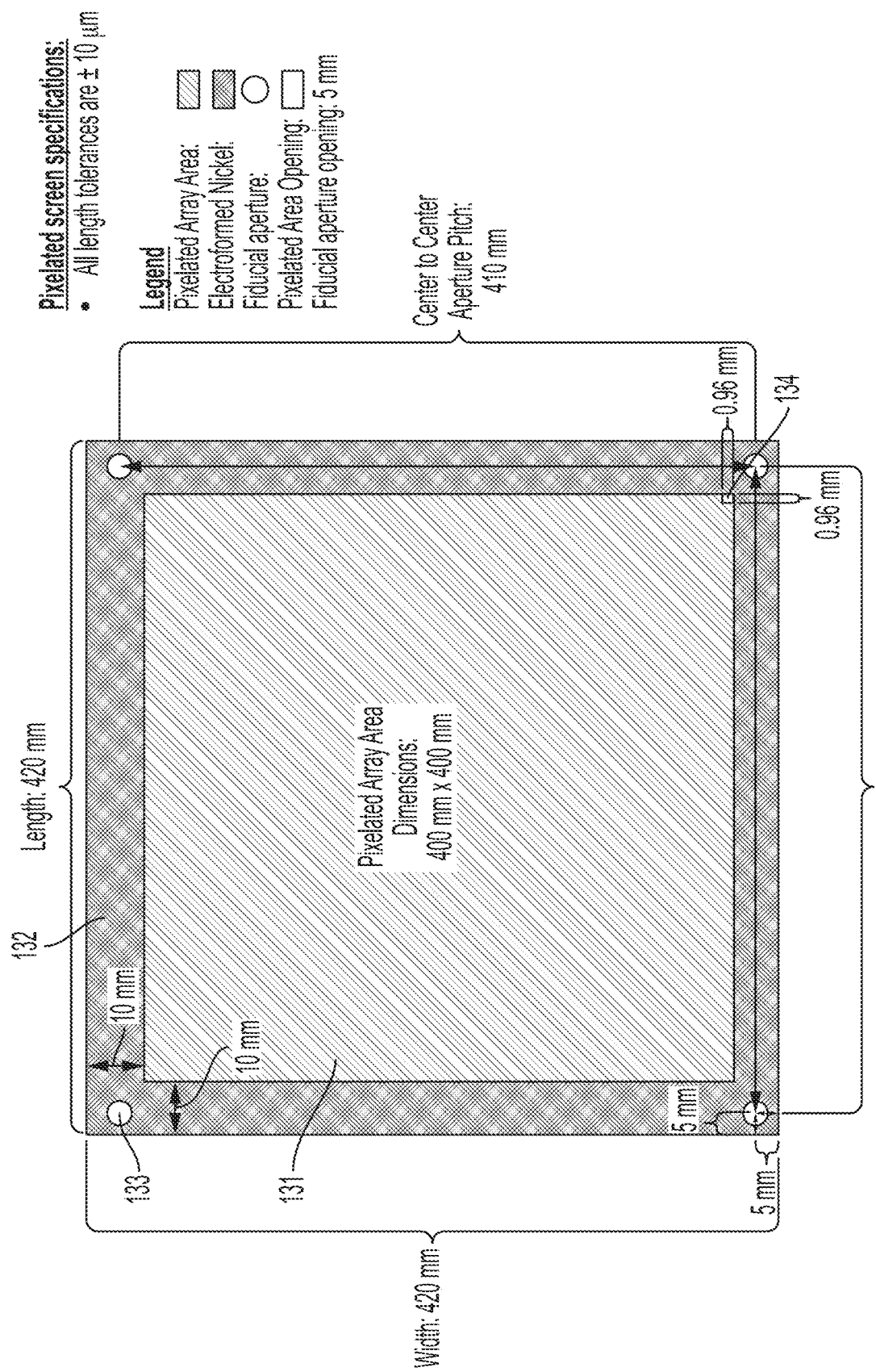
FIG. 2 shows a plan view of a metal aperture sheet according to some embodiments.

Referring to FIG. 2, the metal aperture sheet 130 may include an active area 131, and the plurality of pixel holes 130H may be arranged in the active area 131. The metal aperture sheet 130 may include a perimeter 132 around or surrounding the active area 131. In some embodiments, the perimeter 132 does not include any pixel holes 130H. The active area 131 may have any suitable shape and size. For example, the active area may have a square shape. A breadth (e.g., a length of a side, a diameter of a circle, etc.) of the active area may be about 1 mm or greater, for example, about 1 mm to about 1,000 mm. In some embodiments, the active area is about 400 mm by about 400 mm. The active area may have any suitable area in the plan view, for example, at least about 100 mm$^2$, at least about 1,000 mm$^2$, at least about 10,000 mm$^2$, at least about 100,000 mm$^2$, or at least about 1,000,000 mm$^2$. In some embodiments, the active area is about 160,000 mm$^2$.

The pixel holes 130H may have any suitable shape and size. For example, a pixel hole 130H may have a square shape, and a length of a side of the pixel hole 130H may be about 0.01 mm or greater, for example, about 0.01 mm to about 10 mm. In some embodiments, the pixel holes are about 0.16 mm by about 0.16 mm. In some embodiments, a length or breadth (e.g., diameter) of the pixel holes 130H may be equal to or less than about 1 mm. In some embodiments, an area (e.g., a planar area) of the pixel holes 130H may be equal to or less than about 1 mm$^2$, or equal to or less than about 0.25 mm$^2$.

A distance (e.g., a minimum distance) between adjacent pixel holes 130H may be any suitable distance. The distance between the adjacent pixel holes 130H may be less than, equal to, or greater than a length or breadth of one or both of the adjacent pixel holes 130H. The distance between adjacent pixel holes 130H may be greater than or equal to about 0.005 mm. In some embodiments, the distance between adjacent pixel holes is about 0.04 mm.

The center-to-center distance between adjacent pixel holes 130H may be any suitable distance. For example, when the pixel holes 130H each have a square shape having a length of one side equal to about 0.16 mm, and a minimum distance between adjacent pixel holes 130H is about 0.04 mm, the center-to-center distance between adjacent pixel holes may be about 0.2 mm.

A thickness of the metal aperture sheet 130 may be any suitable thickness. For example, the thickness of the metal aperture sheet 130 may be greater than or equal to about 0.01 mm. In some embodiments, the thickness of the metal aperture sheet 130 is about 0.16 mm. When the thickness of the metal aperture sheet 130 is about 0.16 mm and the pixel holes 130H have a square shape having a length of a side of about 0.16 mm, the volume of a pixel hole 130H may be about (0.16 mm) 3. In some embodiments, a thickness of the metal aperture sheet 130 may be equal to or less than about 1 mm.

The perimeter 132 of the metal aperture sheet 130 may have any suitable shape and size. For example, the perimeter 132 may surround part or all of the active area 131 and may have a substantially uniform width. The width of the perimeter 132 may be in the range of about 1 mm to about 100 mm. In some embodiments, the width of the perimeter 132 is about 10 mm. The perimeter 132 may be fabricated with the active area 131 during the electroforming process. For example, the electrically conductive substrate 110 of the master template may have a first region including the protrusions 120 that corresponds to the active area and a second region that does not include the protrusions 120 that surrounds the first region and corresponds to the perimeter 132.

The metal aperture sheet 130 may have one or more fiducial apertures 133 (e.g., fiducial openings). The fiducial apertures 133 may be utilized to align a plurality of stacked metal aperture sheets 130. For example, dowel pins may be utilized with the fiducial apertures 133 to align the plurality of stacked metal aperture sheets 130. The pixel holes 130H of the plurality of metal aperture sheets 130 may be aligned when the fiducial apertures 133 are aligned. In some embodiments, the fiducial apertures 133 are in the perimeter 132, for example, at corners of the metal aperture sheet 130. The fiducial apertures 133 may have any suitable shape, for example, a circle having a diameter of about 5 mm. In some embodiments, a fiducial aperture 133 at a corner of the metal aperture sheet 130 may be a set distance (e.g., about 5 mm) from the two sides of the metal aperture sheet 130 that cross to form the corner. The fiducial apertures 133 may be formed during the electroforming process. For example, in some embodiments the master template includes fiducial aperture protrusions in the second region, and the fiducial aperture protrusions may include any material that the protrusions 120 may be selected from. During the electroforming process, the metal may form around the fiducial aperture protrusions.

The metal aperture sheet 130 may include a pixel area opening 134. The pixel area opening 134 may be an opening in the active area 131 that is different or distinguishable from the pixel holes 130H. In some embodiments, the pixel area opening 134 is larger (e.g., has a larger planar area) than the pixel holes 130H. For example, the pixel holes 130H may have a 1.6 mm by 1.6 mm or a 0.16 mm by 0.16 mm planar area and the pixel area opening 134 may have a 9.6 mm by 9.6 mm or a 0.96 mm by 0.96 mm planar area, respectively. The pixel area opening 134 may be formed during the electroforming process. For example, the master template may include a pixel area opening protrusion corresponding to the pixel area opening 134, and a material of the pixel area opening protrusion may include any material that the protrusions 120 may be selected from. During the electroforming process, the metal may form around the pixel area opening protrusion. The pixel area opening 134 may be utilized for aligning a plurality of stacked metal aperture sheets 130. For example, the pixel area opening 134 may be at one corner of each of the metal aperture sheets 130, and the pixel area openings 134 may be utilized to determine that fiducial apertures 133 at the one corner of the plurality of metal aperture sheets 130 correspond to each other.

Figure 3:
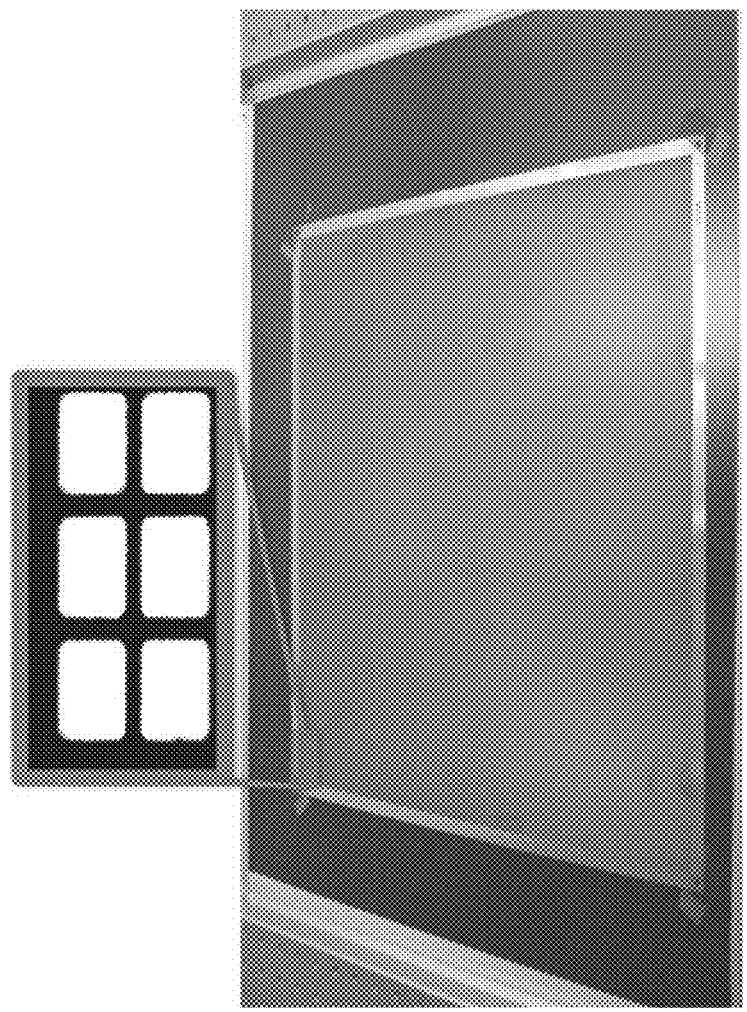
FIG. 3 shows a photo of a metal aperture sheet and a close-up of a portion of the metal aperture sheet.

FIG. 3 illustrates an example metal aperture sheet having a 400 mm by 400 mm active area for imaging, a 0.96 mm by 0.96 mm pixel alignment area openings (e.g., square openings, circular openings, rectangular openings), 5 mm diameter fiducial openings, center-to-center pixel pitch of 0.2 mm, and a pixel volume of 0.16 mm by 0.16 mm by 0.16 mm (i.e., (0.16 mm) 3). Also shown is a magnified image of the pixelated area. The inset displays the morphology of the internal pixel walls. The dark spots present in the visible light photo are characteristic features of warped regions due to internal stress within the material. The alignment area openings enable alignment of the X-ray conversion screen to the pixelated camera.

Bonding the Metal Aperture Sheets

In some embodiments, the X-ray conversion screen includes a plurality of metal aperture sheets 130 arranged in a stack and bonded together. However, the present disclosure is not limited thereto, and in some embodiments the X-ray conversion screen includes a single metal aperture sheet 130. When the X-ray conversion screen includes a plurality of metal aperture sheets 130, the metal aperture sheets may be separately fabricated and then bonded together.

Stacking and bonding a plurality of metal aperture sheets 130 together increases a thickness of pixels in the X-ray conversion screen, which increases the probability that X-rays passing through the pixels will be converted into visible light, thus increasing the conversion efficiency of the X-ray conversion screen. When, instead of separately fabricating the metal aperture sheets 130 and stacking and bonding them together to increase the thickness of the pixels, a single, thick monolithic metal aperture sheet is fabricated by performing a sequence of electroforming processes, the sequentially formed metal layers may suffer from poor adhesion to each other and from warping caused by internal stresses. Accordingly, manufacturing the metal aperture sheets 130 individually and then bonding them together may improve adhesion between adjacent metal aperture sheets 130.

The plurality of metal aperture sheets 130 may be bonded together by any suitable process. For example, diffusion bonding, thermosonic bonding, or thermocompression bonding may be utilized.

In some embodiments, adjacent metal aperture sheets 130 are directly bonded together. In other embodiments, an intermediate metal coating may be applied to one or both of the adjacent metal aperture sheets 130, and the adjacent metal aperture sheets 130 may be bonded together through the intermediate metal coating(s).

An intermediate metal of the intermediate metal coating may be different from a metal of the metal aperture sheet that it is coated on. In some embodiments, the intermediate metal is a metal having a lower melting temperature than the metal of the metal aperture sheet 130 that it is coated on, which allows the adjacent metal aperture sheets 130 to be bonded together at a lower temperature. In some embodiments, the intermediate metal includes nickel, copper, or gold.

The intermediate metal coating may be applied to the metal aperture sheet 130 by any suitable method. In some embodiments, the intermediate metal coating is applied by electroplating, and the intermediate metal is any suitable metal that is able to be electroplated onto the metal aperture sheet 130. In some embodiments, the metal aperture sheet 130 includes nickel, and the intermediate metal coating includes copper or gold. The intermediate metal may be a metal that is soluble with the metal of the metal aperture sheet that it is coated on.

In some embodiments, the entire metal aperture sheet is coated with the intermediate metal, but the present disclosure is not limited thereto. For example, sidewalls of the metal aperture sheet 130 that form the pixel holes 130H are not coated with the intermediate coating, which may be achieved, for example, by covering the sidewalls with a mask during the electroplating of the intermediate coating. In some embodiments, only the surface of the metal aperture sheet 130 that is to be bonded to adjacent metal aperture sheet(s) 130 is coated with the intermediate metal coating.

In some embodiments, adjacent metal aperture sheets are bonded together only at local regions across an area where the adjacent metal aperture sheets are in contact, for example, by welding. In some embodiments, the adjacent metal aperture sheets are bonded together along part or all of an outer perimeter of the area where the adjacent metal aperture sheets are in contact. In some embodiments, the adjacent metal aperture sheets are bonded together in the active area by bonding together at least part of the walls of the metal aperture sheet that define the pixel holes 130H. However, the present disclosure is not limited thereto, and substantially the entire area where the adjacent metal aperture sheets are in contact may be bonded together.

Diffusion bonding may be utilized to bond two adjacent metal aperture sheets 130 together. Diffusion bonding involves bonding two metal surfaces together by heating the metal surfaces to a high temperature and by applying high levels of pressure for a suitable time period to allow the two surfaces to bond together.

Because one or both of the two adjacent metal aperture sheets 130 may be coated with the intermediate metal coating having a melting temperature less than a melting temperature of the metal aperture sheets 130, diffusion bonding may be utilized to bond the two metal aperture sheets 130 at a lower temperature compared to if the two metal aperture sheets 130 were directly bonded together without the intermediate metal coating. For example, when the two metal aperture sheets 130 are nickel and the intermediate metal coating is copper, diffusion bonding may occur at about 850° C., whereas diffusion bonding may otherwise occur at about 1,000° C. if the two metal aperture sheets 130 were directly bonded together by diffusion bonding. However, the intermediate metal coating is not required, and the present disclosure includes embodiments where the two metal aperture sheets 130 are directly bonded together by diffusion bonding.

An X-ray conversion screen including a plurality of metal aperture sheets 130 bonded together by intermediate coatings may thus include a plurality of metal aperture sheets including a first metal and one or more intermediate metal sheets including a second metal alternately arranged with the plurality of metal aperture sheets in a stack. The second metal may be different from the first metal.

Figure 4:
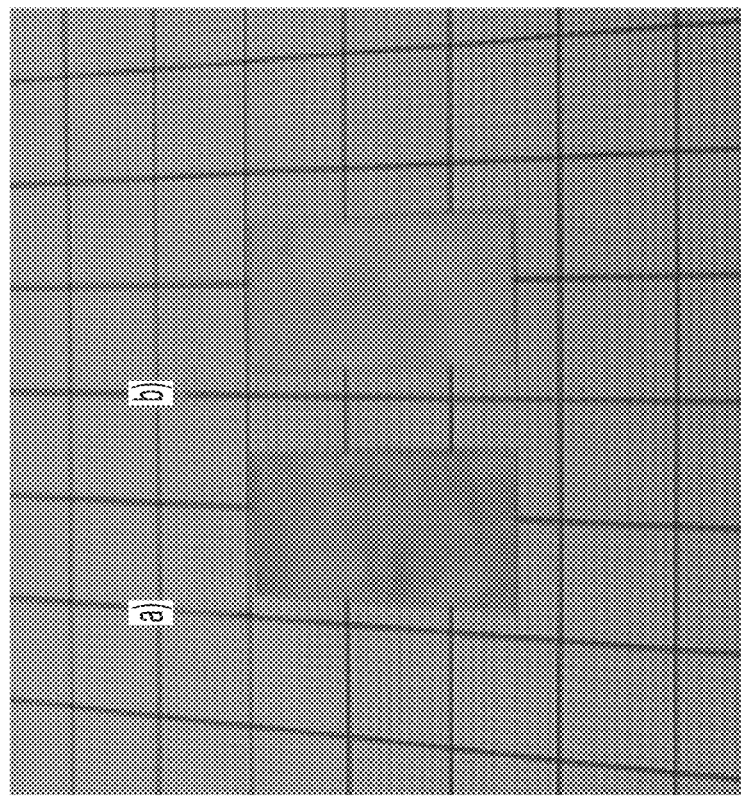
FIG. 4 shows a photo of the results of electroplating copper onto electroplated nickel for two samples.

FIG. 4 illustrates the results of electroplating copper onto electroplated nickel pursuant to the processes described in Table 1 below. The electroplated nickel was cleansed for 60 minutes at 60° C. Then a flowing rinse at room temperature was applied to the electroplated nickel. Then the electroplated nickel was dipped in a sulfuric acid for 3 minutes at room temperature. Then the electroplated nickel was rinsed for half a minute at room temperature. Then the electroplated nickel underwent copper electroplating in an aqueous copper sulfate solution at room temperature for either (a) 5 minutes or (b) 2.5 minutes with a current density of 20 A/ft$^2$. A flowing rinse was then again applied for 2 minutes at room temperature. Sample (a) in FIG. 4 shows the result for a 5 minute copper electroplating deposition time, and sample (b) shows the result for a 2.5 minute copper electroplating deposition time. The copper was shown to have good adhesion to the nickel, and the thickness of the copper layers in samples (a) and (b) were determined to be 0.14 mm and 0.07 mm, respectively.

TABLE 1

Copper electroplating study developed for the nickel screens.

| Process Step | Temp (° C.) | Time (min) | Current (A/ft$^2$) |
| --- | --- | --- | --- |
| Blue Gold Soak Clean (Alkaline Cleaner) | 60 | 60 | |
| Flowing Rinse | Room Temperature | | |
| Acid Dip (10 wt % Sulfuric Acid) | Room Temperature | 3 | |
| Rinse | Room Temperature | 0.5 | |
| Aqueous Copper Sulfate Solution | Room Temperature | [5, 2.5] | 20 |
| Flowing Rinse | Room Temperature | 2 | |

Figure 5:
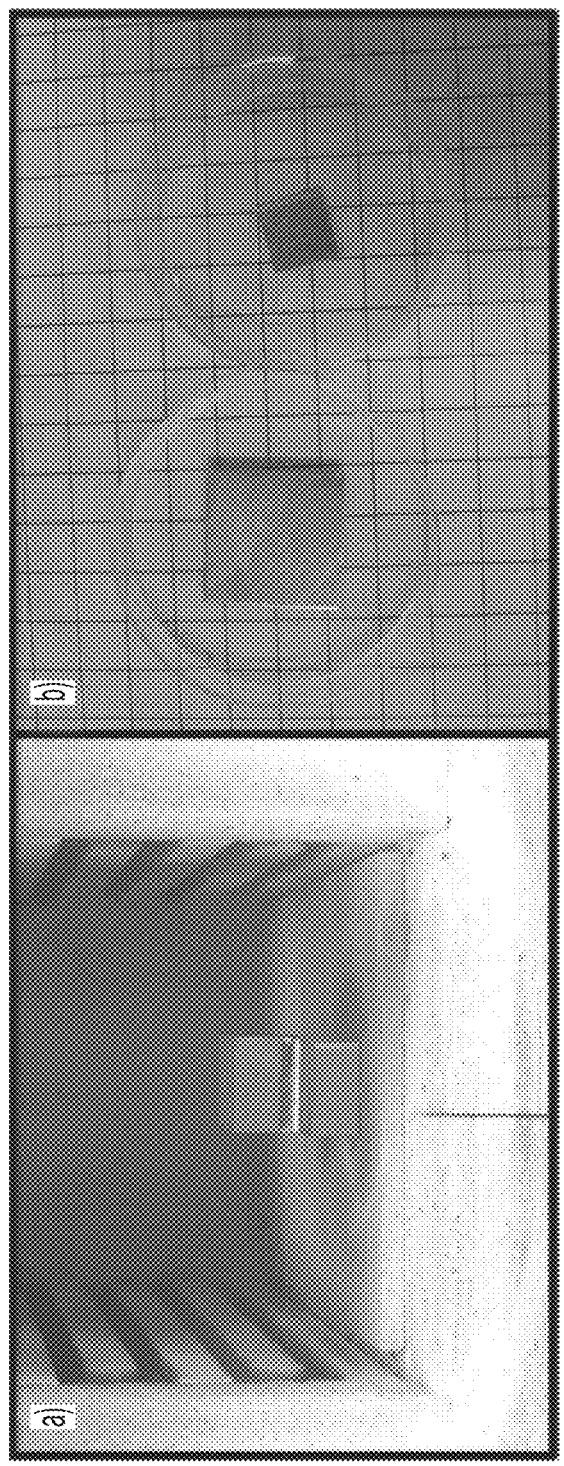
FIG. 5 shows an experimental configuration of a diffusion bonding experiment and the results thereof.

In order to test the feasibility of diffusion bonding, smooth copper (1 inch by 1 inch) plates and copper-coated (0.5 inch by 0.5 inch) nickel sheets were sandwiched together between graphite buffer layers and smooth 304 stainless steel plates. The experimental configuration and results are shown in FIG. 5. Section (a) of FIG. 5 shows a side view of the experimental configuration, which was carried out at 850° C. for 5 hours within an inert argon environment. Section (b) of FIG. 5 shows the successful diffusion bonding attempts.

Any suitable number of individually fabricated metal aperture sheets 130 may be bonded together. Bonding multiple metal aperture sheets together may increase the thickness of the pixels of the X-ray conversion sheet, thereby increasing the X-ray conversion rate of the X-ray conversion screen, as explained above. However, maintaining alignment of the pixel holes 130H of a plurality of stacked metal aperture sheets 130 becomes more difficult as the number of metal aperture sheets 130 increases. Therefore, in some embodiments, a total thickness of a stack of a plurality of metal aperture sheets 130 is less than or equal to about 10 mm.

Reflective Coating

A reflective coating may be applied to sidewalls forming the pixel holes 130H. When X-rays passing through pixels of the X-ray conversion screen are converted into another range of light, for example, visible light, the visible light may be generally confined within the pixels by the metal sidewalls of the metal aperture sheet(s) 130 that form the pixel holes 130H. However, some of the visible light will be absorbed by the sidewalls instead of being reflected. The reflective coating may be any suitable metal having a high reflectivity, for example, silver, but the present disclosure is not limited thereto. In some embodiments, the reflective coating includes nickel, copper, or gold. In some embodiments, the reflective coating is a metal having a reflectivity higher than a reflectivity of the metal aperture sheet 130 and/or a reflectivity of the intermediate metal coating (if present). The reflective coating may increase the probability of reflectance at the sidewalls for at least some wavelengths of light (e.g., at least some wavelengths of visible light, at least some wavelengths of infrared light, and/or at least some wavelengths of ultraviolet light), and thus, the reflective coating may increase the efficiency of the X-ray conversion screen.

Figure 6:
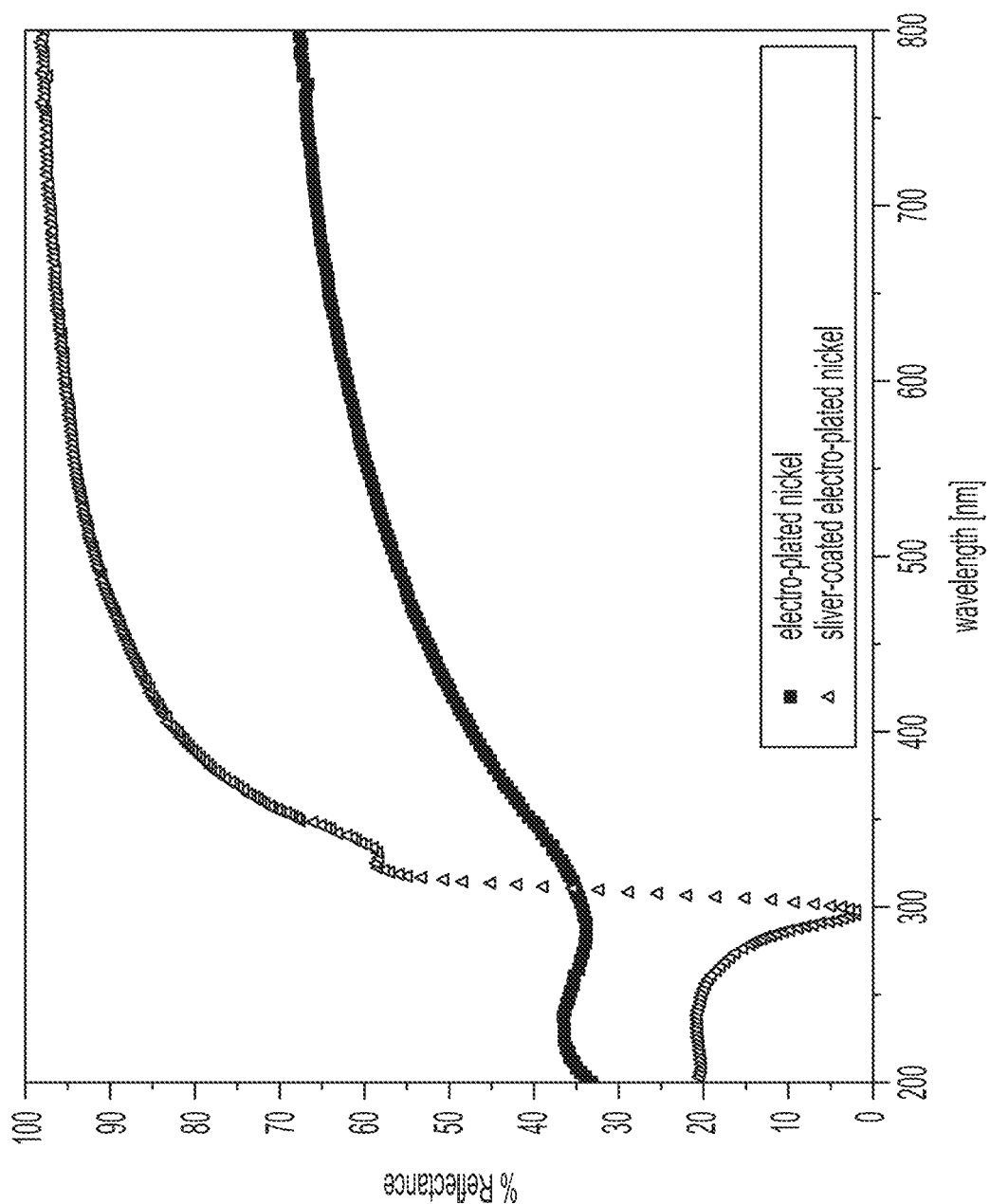
FIG. 6 shows a graph plotting experimental data of reflectance of electro-plated nickel and silver-coated electro-plated nickel.

FIG. 6 shows experimental data of total reflectance through a diffuse reflectance apparatus for electro-plated nickel and silver-coated electro-plated nickel. As shown in FIG. 6, the total reflectance was greater for the silver-coated electro-formed nickel in the near UV and visible wavelength range of 305 nm to 700 nm compared to the electroformed nickel.

The reflective coating may be formed on the sidewalls of the pixel holes 130H through any suitable means. In some embodiments, the reflective coating is formed by electroplating. When electroplating is utilized to form the reflective coating on the sidewalls, the reflective coating may be a metal that is able to be electroplated onto a metal of the metal aperture sheet(s) 130 and/or onto a metal of the intermediate metal coating (if present). The reflective coating may be formed on individual metal aperture sheets 130 prior to being bonded together, or the reflective coating may be formed on a bonded stack of a plurality of metal aperture sheets 130. In some embodiments, the sidewalls forming the pixel holes 130H are coated with the reflective coating, and one or all of the other surfaces of the metal aperture sheet(s) 130 are not coated with the reflective coating. For example, a mask may be applied to the other surface(s) of the metal aperture sheet(s) 130 during the formation (e.g., the electroplating) of the reflective coating on the sidewalls of the pixel holes 130H to substantially prevent the reflective coating from being formed on the other surface(s). However, the present disclosure is not limited thereto. For example, all surfaces of the individual metal aperture sheet(s) may be coated with the reflective coating.

Figure 7:
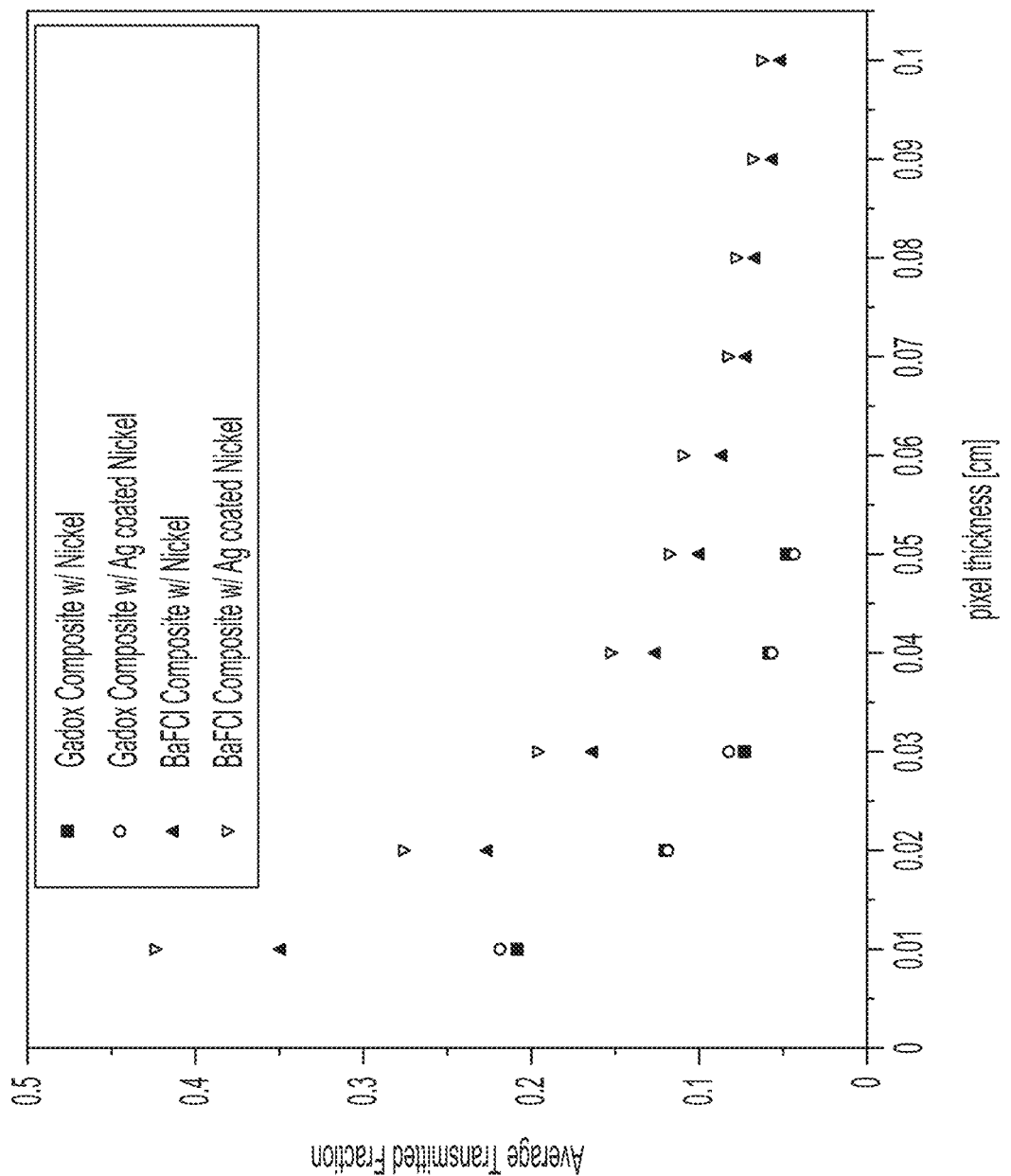
FIG. 7 shows a graph plotting data of an average transmitted fraction of light as a function of pixel thickness for four types of pixels.

An effect of the reflective coating on the efficiency of a pixel may be affected by the scintillator material that is filled in the pixel hole 130H. FIG. 7 shows data plotting the average transmitted fraction of scintillation light through a pixel having a width of 0.16 mm as a function of pixel thickness for four pixels: (1) a pixel including a doped gadolinium oxysulfide $Gd_2O_2S$ (Gadox) scintillator composite with uncoated nickel; (2) a pixel including a Gadox scintillator composite with silver-coated nickel; (3) a pixel including a BaFCl scintillator composite with uncoated nickel; and (4) a pixel including a BaFCl scintillator composite with silver-coated nickel. The data was calculated using a MCNP-FRED script (MCNP and FRED optical ray tracing software). Based on the data of FIG. 7, the reflective coating can improve the optical transport within the Gadox-based systems, as well as improve optical transport in the BaFCl-based systems. These results were surprising and unexpectedly showed that certain scintillator materials will result in an increase in the average transmitted fraction of scintillation light when utilized in combination with a reflective coating, whereas other scintillator materials will not result in a significant increase in an average transmitted fraction of scintillation light even when utilized in combination with a reflective coating.

Scintillator Material

The pixel holes 130H may be filled with a scintillator material. A pixel of the X-ray conversion screen may refer to the scintillator material filled in a pixel hole 130H. The scintillator material may be any material suitable to convert X-rays passing through the pixel into light of another wavelength range (e.g., visible light). The scintillator material may be translucent. In some embodiments, the scintillator material includes doped gadolinium oxysulfide ($Gd_2O_2S$—"Gadox") and/or doped barium fluoride chloride (BaFCl). For example, the scintillator material may be a Gadox and/or BaFCl composite. In some embodiments, the scintillator material includes $Gd_2O_2S:Tb^{3+}$, $BaFCl:Sm^{2+}$, $SrFCl:Sm^{2+}$, $SrFCl:Eu^{2+}$, and/or $BaFCl:Eu^{2+}$.

The scintillator material may include a mixture of an organic binder and scintillator micro crystals, and the scintillator micro crystals may convert the X-rays into visible light. For example, the scintillator micro crystals may include a Gadox and/or BaFCl composite and may be suspended in the organic binder. In some embodiments, the organic binder includes a urethane-based compound, a vinyl-based compound, a styrene-based compound and/or an acrylate-based compound.

Because the present disclosure allows X-ray conversion screens to be fabricated with small pixels (e.g., small-area pixels), the mixture of the organic binder and the scintillator micro crystals may have low viscosity to allow the mixture to be easily filled in the pixel holes 130H. Thus, the pixels may be filled with a deformable material having a viscosity less than or equal to 100,000 cps (centipoise). For example, the mixture may be poured into the pixel holes 130H and hardened (e.g., cured). In some embodiments, the pixel holes 130H may be filled with the scintillator material by melting the scintillator material to form a liquid with a finite viscosity value, forming a screen/melt interface(s), filling the pixel holes 130H with the liquid scintillator material via immersion or capillary action, and slowly cooling the scintillator material in the pixel holes 130H until the scintillator material is in a solid state. However, the present disclosure is not limited thereto. In some embodiments, the scintillator material is grown in the pixel holes. In some embodiments, a scintillator powder may be placed within the pixels and then heated above the melting point of the scintillator material to form a melt that then solidifies into a crystalline solid upon cooling (e.g., slow cooling the melt).

In some embodiments, a refractive index (index of refraction) of the organic binder is substantially the same as a refractive index of the scintillator micro crystals. When the refractive indices of the organic binder and scintillator micro crystals are substantially different from each other, light may scatter at the interface between the organic binder and a scintillator micro crystal. This scattering may increase the optical path length of light passing through a pixel of the X-ray conversion screen, thereby increasing the probability of the light being absorbed, and thus, decreasing the efficiency of the X-ray conversion screen. Accordingly, when the refractive indices of the organic binder and the scintillator micro crystals are substantially the same, the efficiency of the X-ray conversion screen may be increased. In some embodiments, the refractive index of the scintillator micro crystals is within a range of about 0.9 times the refractive index of the organic binder to about 1.1 times the refractive index of the organic binder. In some embodiments, the refractive index of the scintillator crystals is within a range of about 1.3 to about 1.9.

In some other embodiments, the scintillator material includes a glass composition. The glass composition, when in a solid phase, may be in an amorphous (non-crystalline) phase or in a crystalline phase. The glass composition may have a refractive index within a range of about 1.4 to about 2.2 when the glass composition is in an amorphous phase or when the glass composition is in a crystalline phase. Some glass compositions may have a higher refractive index than some mixtures of an organic binder and scintillator crystals, and thus, the glass composition may be utilized instead of the mixture in some embodiments in order to increase the refractive index of the pixels.

The glass composition may include at least one network-forming compound and at least one network modifier compound. In some embodiments, the at least one network-forming compound includes a boron oxide (e.g., borate), a silicon oxide (e.g., silicate), and/or a germanium oxide, and the at least one network modifier compound includes an aluminum oxide, a bismuth oxide, a lead oxide, a uranium oxide, and/or a thallium oxide. The glass composition may include at least one metal dopant ion that is to emit scintillation light. In some embodiments, the at least one metal dopant ion includes a europium dopant ion (e.g., $Eu^{2+}$), a cerium dopant ion (e.g., $Ce^{3+}$), and/or a terbium dopant ion (e.g., $Tb^{3+}$).

For example, the glass composition may include a borate-based glass composition, a silicate-based glass composition, or a germanium oxide-based glass composition, wherein a borate, a silicate, or a germanium oxide, respectively, is a network-forming compound in the composition and is a primary component or a major component of the composition. A silicate-based glass composition may, for example, include a borosilicate glass, wherein the glass composition includes a silicate and a borate as network-forming compounds, and the silicate is the primary component or the major component of the glass composition. A borate-based glass composition may, for example, include one or more network modifier compounds selected from an aluminum oxide, a uranium oxide, and a thallium oxide as the network modifier compound(s) of the glass composition. The properties (e.g., refractive index) of the glass composition are affected in part by the type and concentration of the network modifier compound(s) included in the glass composition. Therefore, the refractive index of the glass composition may be selectively controlled by selecting the type and concentration of the network modifier compound(s) of the glass composition. In some embodiments, the glass composition includes a glass composition including silicon and lead, a glass composition including silicon and bismuth, and/or a glass composition including boride and bismuth.

The glass composition in the pixel holes 130H may be substantially entirely in the amorphous phase, or may include a glass-ceramic including the glass composition in the amorphous phase and the glass composition in the crystalline phase. In some embodiments, the glass-ceramic includes crystals and/or crystallites within the amorphous glass composition, and a composition of the crystals and/or crystallites may be the same or different from a composition of the amorphous glass composition. Glass compositions generally have a higher refractive index when they are in the crystalline phase compared to when they are in the amorphous phase, and thus, the glass composition may be provided as a glass-ceramic in order to controllably increase the average refractive index of the glass composition. In some embodiments, the glass-ceramic includes an X-ray scintillator. In some embodiments, the glass composition is substantially entirely in an amorphous phase when it has a crystalline-to-amorphous ratio (e.g., mass or volume ratio) of a portion the glass composition in the crystalline phase to a portion of the glass composition in the amorphous phase of about 5% or less, about 3% or less, or about 1% or less. Because the refractive index of a glass composition in the crystalline phase may be different (e.g., higher) than the refractive index of the glass composition in the amorphous phase, light scattering in the pixels may be greater when the pixels are provided with a glass composition including a glass-ceramic compared to when the pixels are provided with the glass composition substantially entirely in the amorphous phase. Providing the pixels with the glass composition substantially entirely in the amorphous phase may therefore reduce light scattering in the pixels.

The glass composition may be provided substantially entirely in the amorphous phase by raising the temperature of a glass article (e.g., a glass block, glass sheet, etc.) including the glass composition to a temperature at which the glass composition has a sufficiently low viscosity (e.g., less than or equal to 100,000 cps) to be poured into the pixel holes 130H but below a transformation temperature at which the glass composition transforms from the amorphous phase to the crystalline phase. The glass composition may then be poured into the pixel holes 130H and cooled.

However, a portion of the glass composition in the pixel holes 130H may be in the crystalline phase, and a heat treatment may be applied to the glass composition in the pixel holes 130H to reduce the crystalline-to-amorphous ratio such that the glass composition is substantially entirely in the amorphous phase. For example, the transformation of the glass composition from the amorphous phase to the crystalline phase may substantially only occur within a set temperature range around (e.g., above and/or below) the melting point of the glass composition, and portions of the glass composition in the crystalline phase may preferentially melt into an amorphous liquid at sufficiently high temperatures (e.g., temperatures above the upper boundary of the set temperature range). Therefore, after the glass composition is provided in the pixel holes 130H, the glass composition in the pixel holes 130H may be heated to a temperature sufficiently high to melt at least part of the glass composition that is in the crystalline phase, and the glass composition may be rapidly cooled, for example, by quenching, to solidify the glass composition substantially entirely in the amorphous phase. In some other embodiments, the glass composition is substantially entirely in the amorphous phase after it is provided in the pixel holes 130H, and the heat treatment is not applied.

The glass composition may be provided as the glass ceramic in the pixel holes 130H by various processes, and the glass-ceramic may have a crystalline-to-amorphous ratio within a set range, such as about 10% to about 70% or any subrange subsumed therein, for example, about 10% to about 25%, about 25% to about 40%, about 40% to about 55%, or about 55% to about 70%.

In some embodiments, the glass composition of the glass article may have a crystalline-to-amorphous ratio within the set range, and the process of heating the glass article, filling the pixel holes 130H with the glass composition, and cooling the glass composition may be performed under parameters (e.g., temperature, pressure, etc.) such that the crystalline-to-amorphous ratio of the glass composition in the pixel holes 130H is within the set range (e.g., substantially the same as it was in the glass article).

In some other embodiments, the glass composition of the glass article may have a crystalline-to-amorphous ratio below the set range, and the crystalline-to-amorphous ratio may be increased at least in part during the process of heating the glass composition, filling the pixel holes 130H with the glass composition, and cooling the glass composition. For example, the temperature of the glass composition may be raised and maintained within a set temperature range above the transformation temperature (e.g., above the transformation temperature but below the melting point of the glass composition) for a set period of time to control a nucleation process in which crystals of the glass composition are grown. This may result in the formation of crystals and/or crystallites within an amorphous portion of the glass composition, and a composition of the crystals and/or crystallites may be the same or different from a composition of the amorphous glass composition.

The growth of the crystals may occur from heterogeneous nucleation, wherein the crystals grow from impurities and/or starter crystals in the glass composition. The impurities and/or starter crystals may be provided in the glass article before the glass composition is heated, or the impurities and/or starter crystals may be added and mixed into the glass composition after the glass composition has been heated and its viscosity has been lowered. In some embodiments, a portion of the glass composition of the glass article that is in the crystalline phase may be utilized as starter crystals. Starter crystals that are added to the glass composition after the glass composition has been heated may be micro crystals obtained, for example, by grinding down a larger crystal, and the starter crystals may be the same or different in composition from the glass composition.

In some other embodiments, the growth of the crystals may occur spontaneously through homogeneous nucleation, for example, where substantially no impurities or starter crystals are provided in the glass composition. After the glass composition has been heated and has had its crystalline-to-amorphous ratio increased (e.g., increased to be within the set range), the glass composition may be poured into the pixel holes 130H and cooled.

In some embodiments, after the glass composition is poured into the pixel holes 130H, a heat treatment may be applied to the glass composition in the pixel holes 130H in order to controllably increase the crystalline-to-amorphous ratio. For example, the glass composition in the pixel holes 130H may be heated so that the temperature of the glass composition is increased and maintained within a set temperature range above the transformation temperature for a set period of time in order to induce nucleation, and the glass composition may then be cooled. This heating process may be applied one or more times to control the crystalline-to-amorphous ratio.

Because the present disclosure includes embodiments including a large active area (e.g., 100 mm by 100 mm or larger) and small pixels (e.g., 1 mm by 1 mm or smaller), cutting and sizing a pixel-sized piece of scintillator material for each of the pixel holes 130H may be extremely expensive and cumbersome. Forming the pixels by pouring the glass composition or the mixture of the organic binder and scintillator micro crystals into the pixel holes 130H therefore provides a commercially viable method of forming a large number of small pixels. In some other embodiments, the organic binder is omitted and the pixels may include a single piece of scintillator material (e.g., a monolithic crystal or a polycrystal of the scintillator material) that is formed by melting the scintillator material (e.g., the scintillator crystals), filling the pixel holes 130H with the liquid scintillator material, and solidifying the liquid scintillator material to form pixels.

In some embodiments, a neutron conversion screen may have similar features described herein with reference to the X-ray conversion screen. The pixel holes of the neutron conversion screen may be filled with a neutron-sensitive scintillator material (e.g., a material including lithium fluoride).

In some embodiments, stencil printing techniques are utilized to apply (e.g., pour) the scintillator material (e.g., the glass composition or the mixture of the organic binder and scintillator crystals) into the pixel holes 130H. Stencil printing may improve the uniformity of application of the scintillator material and may efficiently apply the scintillator material to X-ray conversion screens having a large active area.

Figure 8:
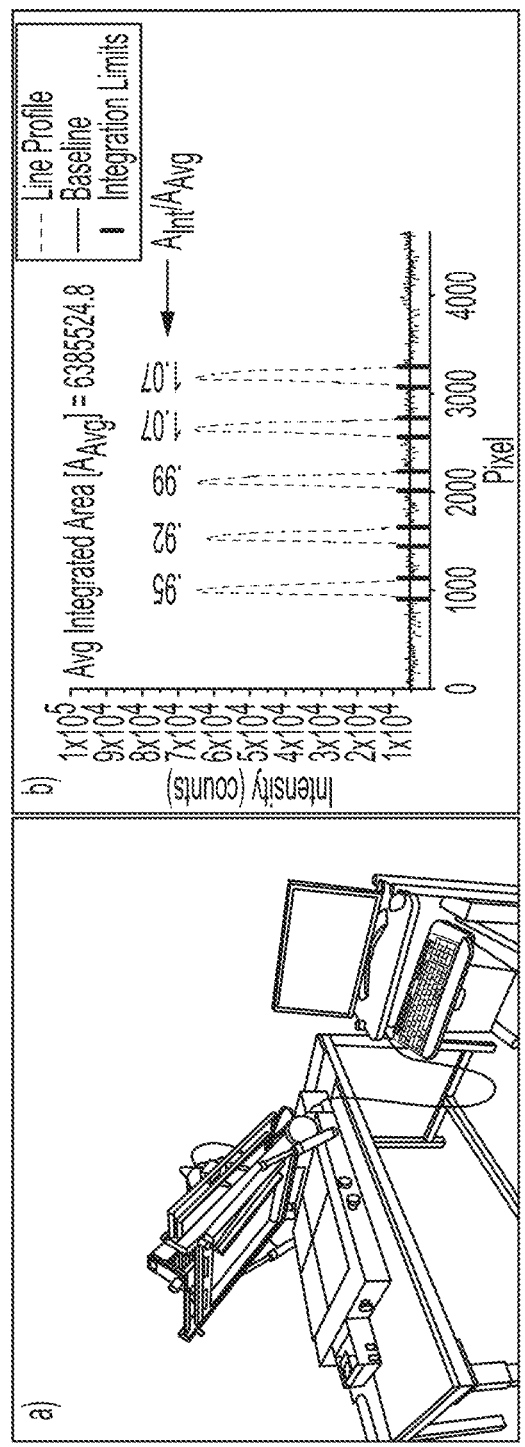
FIG. 8 shows a stencil printing system including surrogate apertures and variations in fluorescence from a doped Gadox composite paste applied through the surrogate apertures.

Part (a) of FIG. 8 shows a completed stencil printing system including surrogate apertures, and part (b) of FIG. 8 shows the variation in fluorescence from a doped Gadox composite paste applied through the surrogate apertures. The maximum deviation from the average was found to be 8 percent.

Figure 9:
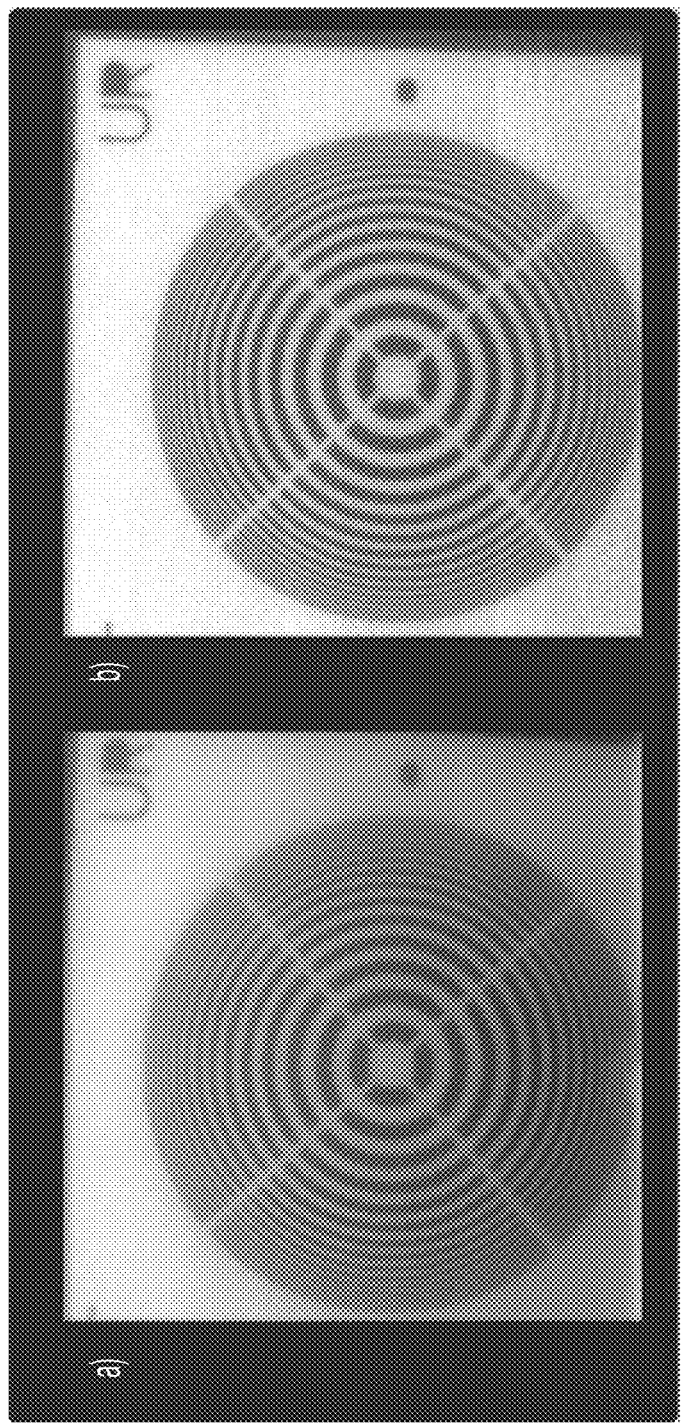
FIG. 9 shows a comparison of high energy X-ray images developed using a commercial gadox film in image (a) and a pixelated Gadox-based conversion screen in image (b)

The pixelated X-ray conversion screen of the present disclosure provides contrast improvements for high energy X-ray images. FIG. 9 shows a comparison of high energy X-ray images of a 5 mm thick tantalum phantom taken through a 12.7 mm tungsten filter using high energy X-rays from a Microtron operating at 10 MeV. Image (a) in FIG. 9 shows the tantalum test pattern in front of a 0.4 mm thick commercial gadox film, and image (b) in FIG. 9 shows the tantalum test pattern in front of a 0.1 mm thick pixelated Gadox screen after calibration. The exposure time was the same for both image (a) and for image (b). Image (b) is noisier due to the relatively lower thickness of the Gadox screen compared to the gadox film, but image (b) has enhanced contrast through the reduction in optical and X-ray scattering contributions. Some of the fuzziness in images (a) and (b) may be due to non-optimal mounting conditions.

Figure 10:
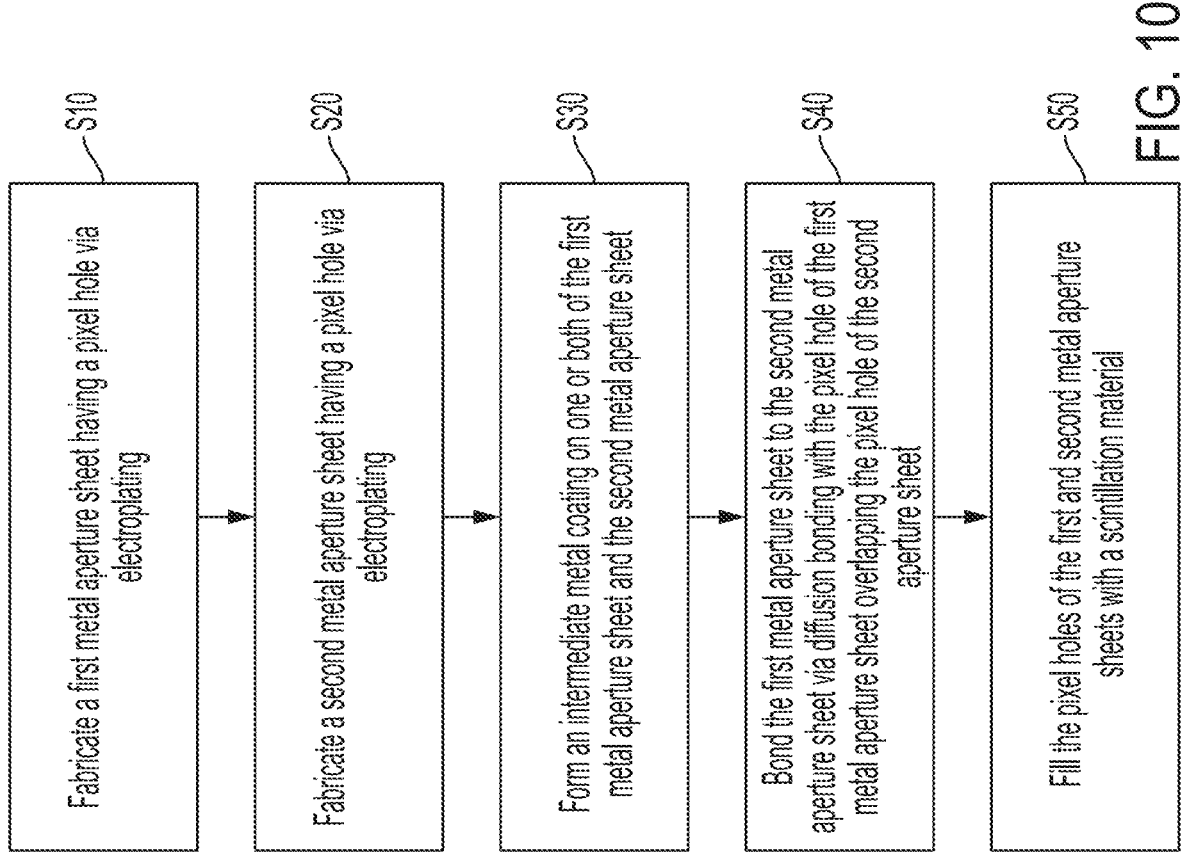
FIG. 10 shows a flow chart for a method of fabricating an X-ray conversion screen according to an embodiment.

FIG. 10 shows a flow chart of a method of fabricating an X-ray conversion screen according to an embodiment. In a process S10, a first metal aperture sheet having a pixel hole may be fabricated via electroforming. In a process S20, a second metal aperture sheet having a pixel hole may be fabricated via electroforming. In a process S30, one or both of the first metal aperture sheet and the second metal aperture sheet may be coated with an intermediate metal coating. In a process S40, the first metal aperture sheet and the second metal aperture sheet may be bonded together via diffusion bonding such that the pixel holes for the first and second metal aperture sheets overlap. In a process S50, the pixel holes of the first and second metal aperture sheets are filled with a scintillator material to form a pixel of the X-ray conversion screen.

Figure 11:
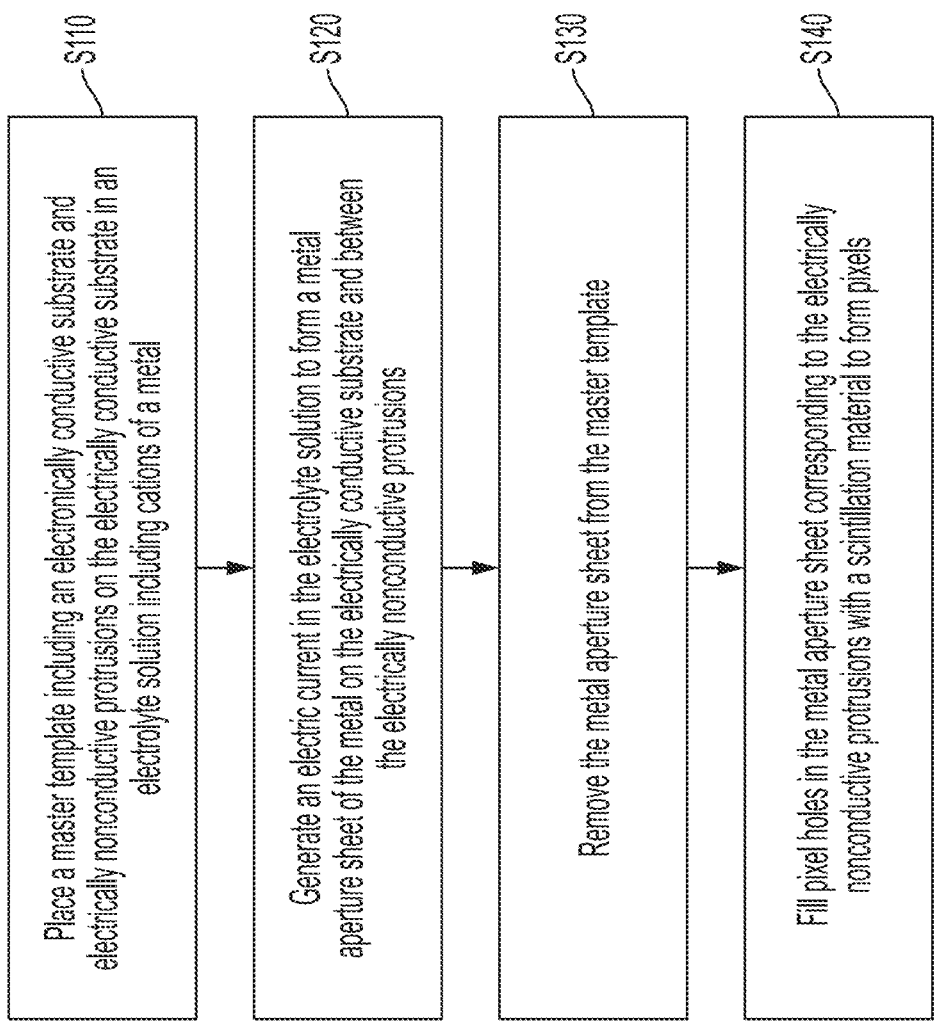
FIG. 11 shows a flow chart for a method of fabricating an X-ray conversion screen according to an embodiment.

FIG. 11 shows a flow chart for a method of fabricating an X-ray conversion screen according to an embodiment. In a process S110, a master template including an electrically conductive substrate and electrically nonconductive protrusions on the electrically conductive substrate may be placed in an electrolyte solution that includes cations of a metal. In a process S120, an electric current may be generated in the electrolyte solution to form a metal aperture sheet of the metal on the electrically conductive substrate and between the electrically nonconductive protrusions. In a process S130, the metal aperture sheet may be removed from the master template. Processes S110, S120, and S130 may be performed once to form one metal aperture sheet or performed a plurality of times to form a plurality of metal aperture sheets, and the plurality of metal aperture sheets may be bonded together. In a process S140, the pixel holes in the metal aperture sheet corresponding to the electrically nonconductive protrusions may be filled with a scintillator material to form pixels.

Figure 12:
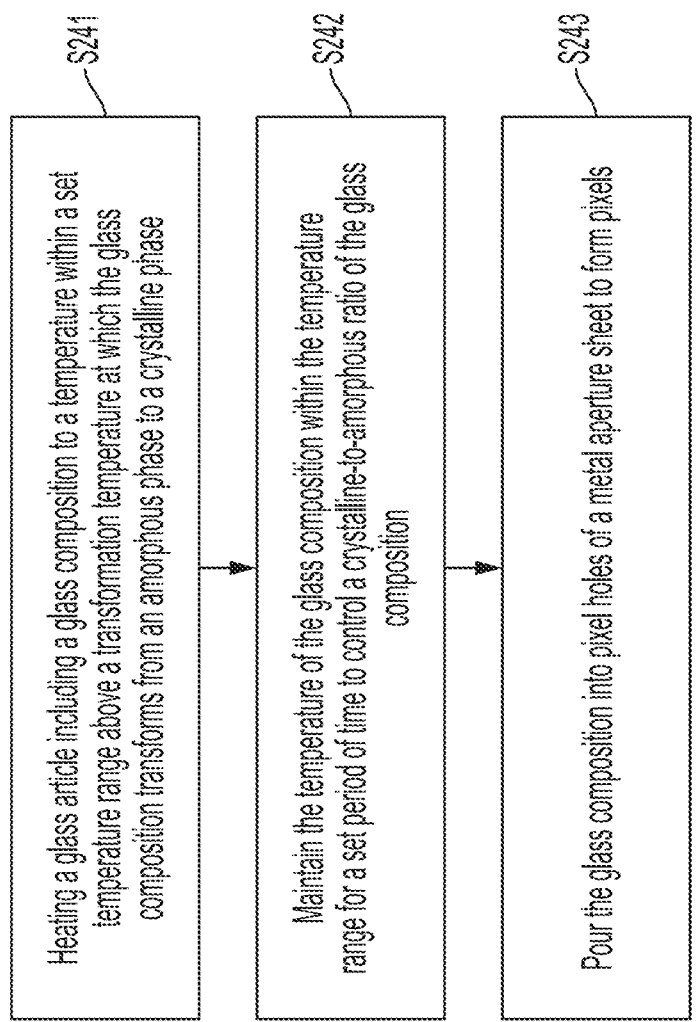
FIG. 12 shows a flow chart for a method of fabricating an X-ray conversion screen according to an embodiment.

FIG. 12 shows a flow chart for a method of fabricating an X-ray conversion screen according to an embodiment and, more particularly, shows processes for filling pixel holes in a metal aperture sheet with a scintillator material to form pixels of the X-ray conversion screen according to an embodiment. In a process S241, a glass article including a glass composition may be heated to a temperature within a set temperature range above a transformation temperature at which the glass composition transforms from an amorphous phase to a crystalline phase. In a process S242, the temperature of the glass composition may be maintained within the set temperature range for a set period of time to control a crystalline-to-amorphous ratio of the glass composition. In a process S243, the glass composition is poured into pixel holes of the metal aperture sheet to form pixels.

Figure 13:
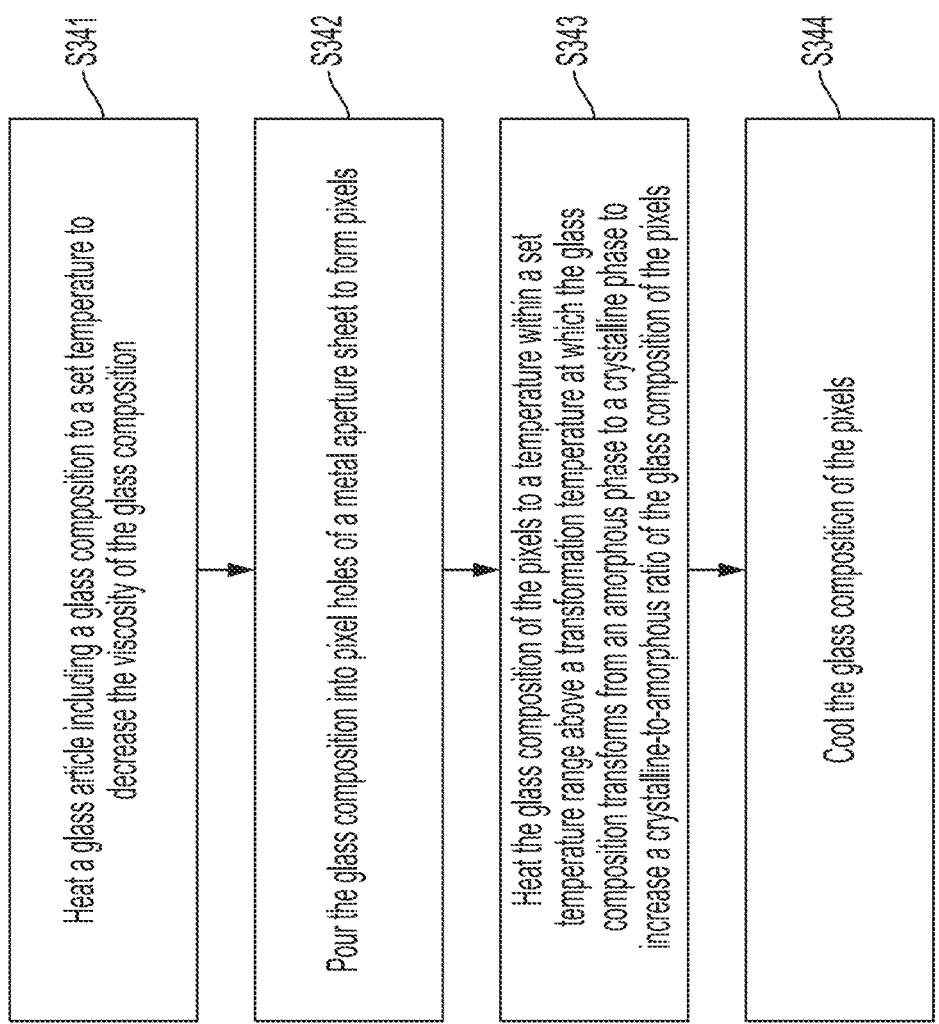
FIG. 13 shows a flow chart for a method of fabricating an X-ray conversion screen according to an embodiment.

FIG. 13 shows a flow chart for a method of fabricating an X-ray conversion screen according to an embodiment and, more particularly, shows processes for filling pixel holes in a metal aperture sheet with a scintillator material to form pixels of the X-ray conversion screen according to an embodiment. In a process S341, a glass article including a glass composition is heated to a set temperature to decrease the viscosity of the glass composition. In a process S342, the glass composition may be poured into the pixel holes of a metal aperture sheet to form pixels. In a process S343, the glass composition of the pixels may be heated to a temperature within a set temperature range above a transformation temperature at which the glass composition transforms from an amorphous phase to a crystalline phase to increase a crystalline-to-amorphous ratio of the glass composition of the pixels. In a process S344, the glass composition of the pixels may be cooled.

Any X-ray conversion screens illustrated, described, and/or otherwise within the scope of the present disclosure may be utilized in an X-ray system configured to generate an X-ray image of an object. The X-ray system may include an X-ray generator, an X-ray imaging system, and the X-ray conversion screen. The X-ray conversion screen may be provided in, or may be separate from, the X-ray imaging system.

The X-ray generator may be any device configured to generate (e.g., controllably generate) X-rays. The X-ray generator may, for example, include an X-ray tube or may utilize radioisotopes to generate X-rays. The X-ray generator may also include a power source to supply power to the X-ray tube, a cooling system to cool the X-ray tube, and a controller configured to control operations of the X-ray tube, the cooling system, and/or other devices of the X-ray generator.

The X-ray imaging system may include X-ray film and/or a digital detector configured to receive X-rays and produce a digital image from the X-rays. The X-ray generator and the X-ray imaging system may be oriented or orientable to allow X-rays generated by the X-ray generator to be passed through an X-ray conversion screen and received by the X-ray imaging system. An X-ray image of an object may be generated by placing the object in the X-ray system between the X-ray generator and the X-ray conversion screen, and operating the X-ray system to pass X-rays through the object, through the X-ray conversion screen, and to the X-ray imaging system.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific examples are disclosed only as illustrative embodiments. The scope of the technology is defined by the following claims and any equivalents thereof.

What is claimed is:

1. A pixelated X-ray conversion screen, comprising:
a plurality of metal aperture sheets, each of the plurality of metal aperture sheets having a pixel hole having an area in a plan view equal to or less than about 0.25 mm$^2$, the pixel hole of a metal aperture sheet of the plurality of metal aperture sheets being filled with a scintillator material comprising a mixture comprising scintillator crystals and an organic binder,
wherein the plurality of metal aperture sheets are arranged in a stack and bonded together, and
wherein the respective pixel holes of the plurality of metal aperture sheets are aligned in the plan view.

2. The pixelated X-ray conversion screen of claim 1, wherein the metal aperture sheet includes an active area having a plurality of pixel holes, an area of the active area in the plan view being equal to or greater than about 10,000 mm$^2$, and
wherein a minimum distance between adjacent pixel holes of the plurality of pixel holes is equal to or less than about 0.5 mm.

3. The pixelated X-ray conversion screen of claim 1, wherein the plurality of metal aperture sheets comprise a first metal, and
wherein the pixelated X-ray conversion screen further comprises an intermediate metal sheet between adjacent metal aperture sheets of the plurality of metal aperture sheets and comprising a second metal different from the first metal.

4. The pixelated X-ray conversion screen of claim 1, wherein a refractive index of the scintillator crystals is within a range of about 1.3 to about 1.9, and the scintillator crystals are substantially the same in refractive index as the organic binder.

5. The pixelated X-ray conversion screen of claim 1, wherein a sidewall of the metal aperture sheet forming the pixel hole is coated with a reflective coating, the reflective coating comprising a different metal than the metal aperture sheet.

6. A pixelated X-ray conversion screen, comprising:
a plurality of metal aperture sheets, each of the plurality of metal aperture sheets having a pixel hole having an area in a plan view equal to or less than about 0.25 mm$^2$ and filled with a scintillator material, wherein the plurality of metal aperture sheets are arranged in a stack and bonded together.

7. The pixelated X-ray conversion screen of claim 6, further comprising one or more intermediate metal sheets alternately arranged with the plurality of metal aperture sheets, the one or more intermediate metal sheets comprising a different metal than the metal aperture sheets.

8. The pixelated X-ray conversion screen of claim 6, wherein an area of a metal aperture sheet of the plurality of metal aperture sheets in the plan view is equal to or greater than about 10,000 mm$^2$, and
wherein a thickness of the stack is equal to or less than about 10 mm.

9. The pixelated X-ray conversion screen of claim 6, wherein the scintillator material comprises a mixture comprising scintillator crystals and an organic binder, a refractive index of the scintillator crystals being within a range of about 1.3 to about 1.9, and the scintillator crystals being substantially the same in refractive index as the organic binder.

10. The pixelated X-ray conversion screen of claim 6, wherein the scintillator material comprises a glass composition having a refractive index within a range of about 1.4 to about 2.2.

11. The pixelated X-ray conversion screen of claim 10, wherein the scintillator material comprises a glass-ceramic comprising pixels within a portion of the glass composition in an amorphous phase.

12. The pixelated X-ray conversion screen of claim 10, wherein the glass composition is substantially entirely in an amorphous phase.

13. A pixelated X-ray conversion screen, comprising:
a metal aperture sheet having a pixel hole filled with a scintillator material comprising a glass composition, an area of the pixel hole in a plan view being equal to or less than about 0.25 mm$^2$.

14. The pixelated X-ray conversion screen of claim 13, wherein the metal aperture sheet includes an active area having a plurality of pixel holes, an area of the active area in the plan view being equal to or greater than about 10,000 mm$^2$, and
wherein a minimum distance between adjacent pixel holes of the plurality of pixel holes is equal to or less than about 0.5 mm.

15. The pixelated X-ray conversion screen of claim 13, further comprising a plurality of metal aperture sheets comprising the metal aperture sheet, each of the plurality of metal aperture sheets having a pixel hole having an area in the plan view equal to or less than about 0.25 mm$^2$,
wherein the plurality of metal aperture sheets are arranged in a stack and bonded together, and
wherein the respective pixel holes of the plurality of metal aperture sheets are aligned in the plan view.

16. The pixelated X-ray conversion screen of claim 13, wherein the glass composition comprises a glass-ceramic comprising crystals within a portion of the glass composition in an amorphous phase.

17. The pixelated X-ray conversion screen of claim 13, wherein the glass composition comprises at least one network-forming compound comprising a boron oxide, a silicon oxide, and/or a germanium oxide.

18. The pixelated X-ray conversion screen of claim 17, wherein the glass composition is a borate-based glass composition.

19. The pixelated X-ray conversion screen of claim 18, wherein the glass composition further comprises at least one network modifier compound comprising an aluminum oxide, a bismuth oxide, a lead oxide, a uranium oxide, and/or a thallium oxide.

20. A pixelated X-ray conversion screen, comprising:
a metal aperture sheet having a pixel hole filled with a scintillator material comprising a mixture comprising scintillator crystals and an organic binder, an area of the pixel hole in a plan view being equal to or less than about 0.25 mm$^2$,
wherein a refractive index of the scintillator crystals is within a range of about 1.3 to about 1.9, and the scintillator crystals are substantially the same in refractive index as the organic binder.

* * * * *